United States Patent
Frank

(10) Patent No.: US 8,454,064 B2
(45) Date of Patent: Jun. 4, 2013

(54) ARRANGEMENT AND METHOD FOR ATTACHING A BUMPER TO SIDE MEMBERS OF A VEHICLE

(75) Inventor: Simon Frank, Tengen/Watterdingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/415,118

(22) Filed: Mar. 8, 2012

(65) Prior Publication Data

US 2012/0228890 A1    Sep. 13, 2012

Related U.S. Application Data

(63) Continuation-in-part of application No. 12/298,717, filed as application No. PCT/EP2007/003375 on Apr. 17, 2007, now Pat. No. 8,246,092.

(30) Foreign Application Priority Data

Apr. 25, 2006    (DE) .......................... 10 2006 019 654
Apr. 25, 2006    (DE) .......................... 10 2006 040 178

(51) Int. Cl.
    *B60R 19/26*    (2006.01)
(52) U.S. Cl.
    USPC .......................................... 293/155; 293/133
(58) Field of Classification Search
    USPC ....... 293/132, 133, 155; 296/187.09; 188/377
    See application file for complete search history.

(56) References Cited

U.S. PATENT DOCUMENTS

| | | | |
|---|---|---|---|
| 4,563,028 A | 1/1986 | Ogawa et al. | |
| 5,080,410 A | 1/1992 | Stewart et al. | |
| 5,660,116 A * | 8/1997 | Dannawi et al. | ........... 105/392.5 |
| 5,725,267 A | 3/1998 | Grosser et al. | |
| 6,502,874 B2 * | 1/2003 | Kajiwara et al. | ............... 293/133 |
| 7,188,877 B2 * | 3/2007 | Gonzalez et al. | ............. 293/133 |
| 7,401,825 B2 * | 7/2008 | Frank et al. | .................... 293/155 |
| 7,407,206 B2 * | 8/2008 | Arns et al. | ...................... 293/133 |
| 7,494,167 B2 * | 2/2009 | Braunbeck et al. | ........... 293/133 |
| 7,810,868 B2 * | 10/2010 | Braunbeck et al. | ...... 296/187.03 |
| 7,938,476 B2 * | 5/2011 | Braunbeck et al. | ...... 296/187.03 |
| 8,020,907 B2 * | 9/2011 | Wibbeke et al. | ............... 293/133 |

(Continued)

FOREIGN PATENT DOCUMENTS

| | | |
|---|---|---|
| DE | 29823973 U1 | 3/2000 |
| EP | 0718158 A1 | 6/1996 |

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

An arrangement for fastening a bumper to a vehicle includes a deformation organ having one end for attachment to the bumper, and another end for sliding into a side member. The insertion section includes an inner wall which is stretchable when subjected to a tensile force. For elongating the inner wall, a material strip is received in a receiving space and equipped with a threaded breakthrough, which is aligned with a breakthrough of the adjacent transverse wall for receiving a tensile screw. The tensile screw extends through a breakthrough in a side member and exerts a force which elongates the inner wall. This initially provides a loose sliding-in of the insertion section in the side member and, following stretching of the inner wall, a tight seat of the insertion section in the side member.

9 Claims, 2 Drawing Sheets

U.S. PATENT DOCUMENTS

| | | | |
|---|---|---|---|
| 8,052,184 B2 * | 11/2011 | Braunbeck et al. | 293/133 |
| 8,177,269 B2 * | 5/2012 | Braunbeck et al. | 293/132 |
| 8,210,601 B2 * | 7/2012 | Terada et al. | 296/187.09 |
| 8,246,092 B2 * | 8/2012 | Frank | 293/155 |
| 2007/0261592 A1 * | 11/2007 | Mochida et al. | 105/392.5 |
| 2008/0238142 A1 * | 10/2008 | Braunbeck et al. | 296/187.03 |
| 2012/0228890 A1 * | 9/2012 | Frank | 293/155 |

FOREIGN PATENT DOCUMENTS

| | | |
|---|---|---|
| EP | 0894675 A1 | 2/1999 |
| EP | 1079992 A1 | 3/2001 |
| EP | 1342625 A1 | 9/2003 |
| EP | 1862377 A2 | 12/2007 |
| FR | 2876645 A1 | 4/2006 |

* cited by examiner

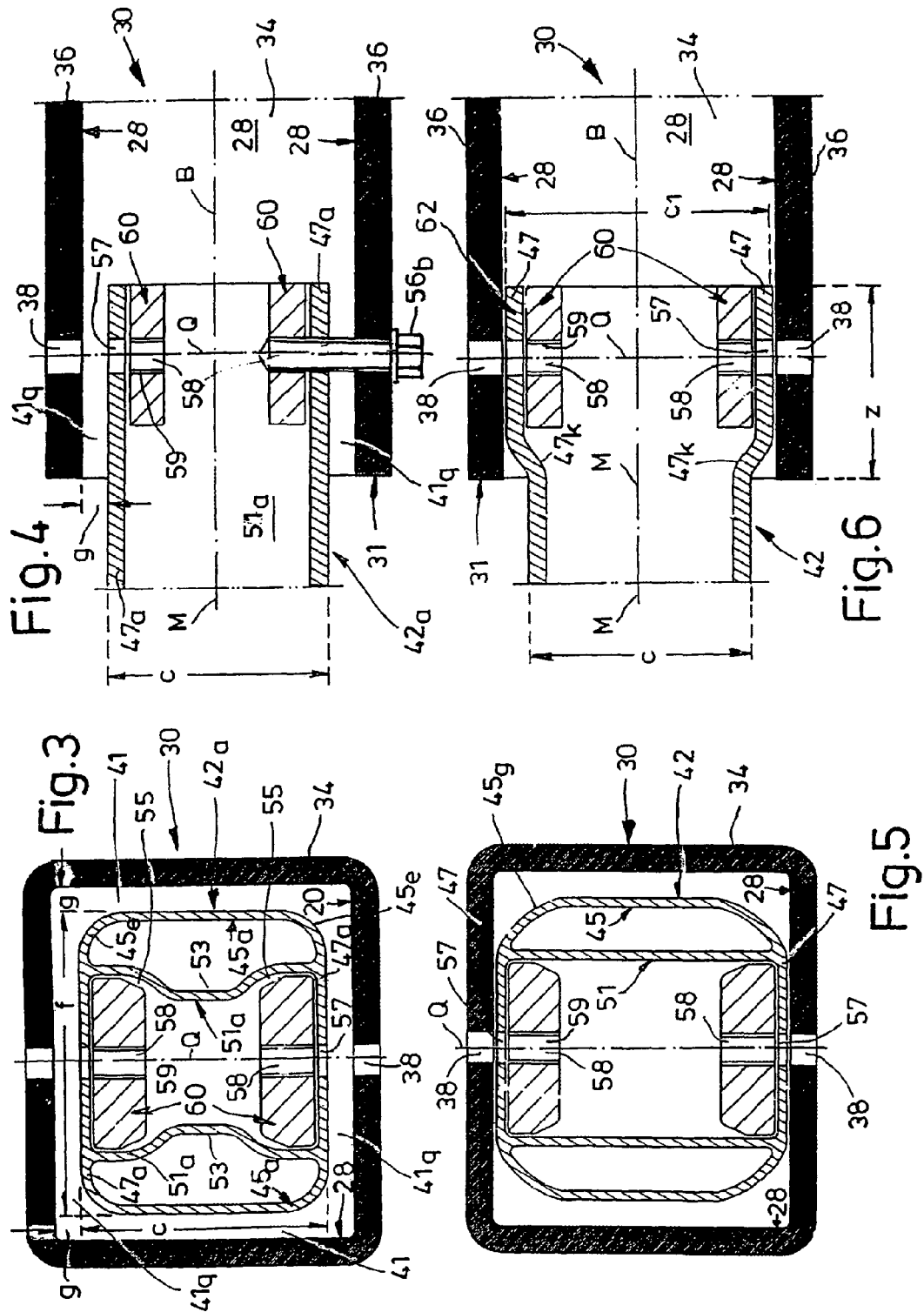

ARRANGEMENT AND METHOD FOR ATTACHING A BUMPER TO SIDE MEMBERS OF A VEHICLE

CROSS REFERENCE TO RELATED APPLICATIONS

This is a continuation-in-part of U.S. patent application Ser. No. 12/298,717 filed Jan. 22, 2010, now U.S. Pat. No. 8,246,092 which is a U.S. National-Stage entry under 35 U.S.C. §371 based on International Application No. PCT/EP2007/003375, filed Apr. 17, 2007, which was published under PCT Article 21(2), and claims priority to German Application Nos. 102006019654.6, filed Apr. 25, 2006, and claims priority to German Application No. 102006040178.6, filed Apr. 25, 2006, which are all hereby incorporated in their entirety by reference.

TECHNICAL FIELD

The present disclosure relates to an arrangement for fastening a bumper to side members of a vehicle.

BACKGROUND

EP 1 079 992 B1 discloses a device in a vehicle for absorbing impact energy with a fastening member for a bumper element on the vehicle frame; that fastening member has at least two walls running in longitudinal direction, which are provided with openings to receive penetrating pins. During a collision impact or a vehicle collision, the pins are moved along predetermined lines relative to the respective energy-absorbing walls of the fastening member in order to enlarge those openings subject to the formation of strips. To this end, the pins are designed so that they shear off the wall material in order to enlarge or elongate the openings in the energy-absorbing wall.

EP 0 718 158 B1 discloses a bumper with plate-like holders crossing the longitudinal axis of its side member. In addition to the cross-sectional shape of the bumper, the configuration of the connection to the vehicle side member also influences its shape retention and its compensation ability with respect to the impacting deformation energy.

U.S. Pat. Nos. 5,080,410 or 4,563,028 disclose fastening the bumper to the vehicle using a multiplicity of holders which, however, do not contribute to the improvement of the shape retention of a bumper in the event of an impact.

EP 0 894 675 A1 discloses a bumper arrangement, wherein the holding elements of the bumper widen conically and the outer walls of which hug the profile wall of the bumper or merge with the latter in this way.

DE 298 23 973 U1 discloses particularly light bumpers which are reinforced in severely loaded regions by an additional profile. The reinforcement profile can also consist of a holding device for the bumper. In the latter case, the side walls of the holding device widen conically and come to bear against the profile strips of the bumper.

SUMMARY

The present disclosure provides an arrangement for fastening a bumper which, with low weight has a high degree of shape retention with adequate compensation capability for the impacting deformation energy, so that an efficient energy absorption element is created. Manufacture and handling of the arrangement are to be very simple and the side member forces lower as well as central. In addition, the inaccuracy of the components during the joining process is to be compensated and a relatively large gap between crash box and side member is to be closed.

In addition, the present disclosure includes all combinations of the features disclosed in the description, the drawings, and/or the claims. In the case of stated designation regions, values located within and proximate the mentioned limits are to be also contemplated by the present disclosure and are variously employable as limit values.

According to an embodiment, the arrangement includes a deformation organ which on the one end is provided for attachment to the bumper, and on the other end includes an insertion section for sliding into one of the side members, wherein the insertion section comprises transverse walls and an inner wall molded onto the transverse walls on both ends which are channel-like in cross section and is stretchable when subjected to a tensile force acting on the transverse walls. This makes possible initially a simple sliding-in of the insertion section in the side member with play and, subsequently, following stretching of the inner wall, a tight seat of the insertion section in the side member.

In accordance with an embodiment, the inner wall can be arranged between the side walls of the insertion section connecting the transverse walls.

Preferentially, the transverse walls are connected to the side walls via corner regions curved in the manner of a pitch circle.

For elongating the inner wall, a material strip can be provided which is received in a receiving space of the insertion section and equipped with a threaded breakthrough, which is in alignment with a breakthrough of the adjacent transverse wall in order to be able to receive a tensile screw.

In that the tensile screw furthermore extends through a breakthrough of the one side member it is able to exert the force necessary for elongating the inner wall.

Breakthroughs for two tensile screws opposite each other are preferentially arranged on both sides of a center line of the insertion section and may have a common center axis.

The deformation organ (40) can be practically produced from an extruded profile element (42*a*), more preferably from light metal.

The present disclosure further provides an arrangement having a bumper, side members and a deformation organ, which on the one end is attached to the bumper and on the other end includes an insertion section slid into the side member and which is obtained out of the arrangement described above through the pulling of the transverse walls of the insertion section against transverse walls of the one side member.

BRIEF DESCRIPTION OF THE DRAWINGS

The present invention will hereinafter be described in conjunction with the following drawing figures, wherein like numerals denote like elements, and:

FIGS. 3 and 4 illustrate cross sections through a side member with a profile element as holder inserted in one side member prior to being pulled apart; and FIGS. 5 and 6 illustrate cross sections through the side member after being pulled apart.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
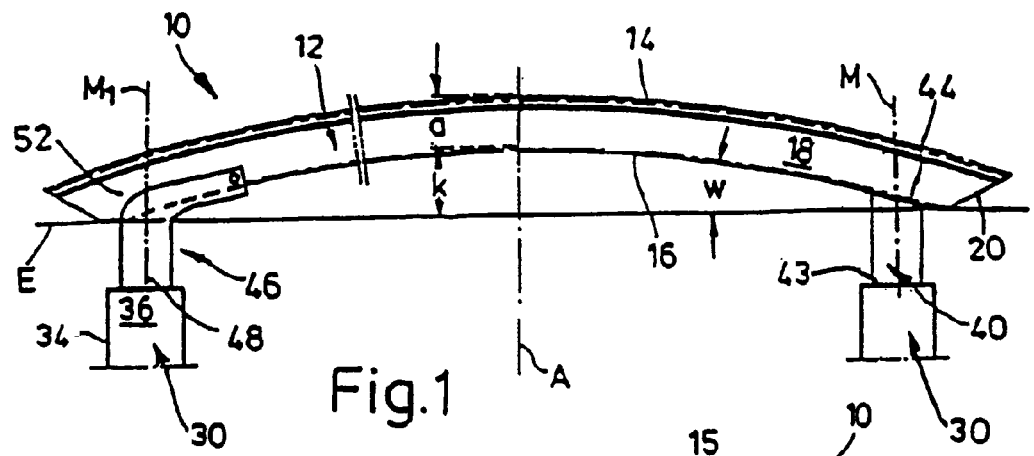
FIG. 1 is a top view of a bumper having holders—formed differently on both ends of the bumper—for connection to a side member.

A bumper 10 extruded from an aluminum alloy of a passenger car (not reproduced for reasons of clarity) has a box-shaped hollow profile 12 according to FIG. 1 with two profile walls 14, 16 running at a spacing a relative to each other, which are connected through two transverse or flank walls 18. The hollow profile 12 is assigned to a transverse plane E—running at a right angle to the vehicle longitudinal axis indicated at A—and on both sides of the vehicle longitudinal axis A forming a symmetry plane here and evenly curved towards that transverse plane E; towards the latter, the hollow profile 12 determines a curvature dimension k in the longitudinal axis A located in the curvature zenith. When installed, the outer profile 14 facing away from the transverse plane E forms an outer or pressure belt capable of absorbing shock forces. The other—inner—profile wall 14 forms an inner or tension belt.

The bumper 10 is assigned to a pair of vehicle side members 30 of rectangular cross section preferably formed of steel, which run on both sides parallel to the vehicle longitudinal axis A. These, in turn, may be assembled from two parallel side walls 34 and transverse walls 36 connecting these, which delimit an interior space 32 of the vehicle side member 30.

Near the right face edge 20 of the hollow profile 12, a tubular deformation organ 40 of a profile piece is indicated on the right hand side in FIG. 1, which on the one end is attached to the inner profile wall 16 and, on the other end, is assigned with an insertion section 43 to the vehicle side member 30. The deformation organ 40 (also called a crash box) may likewise be produced from a profile element extruded from light metal and on the end facing the bumper 10 beveled to the center line M of the deformation organ 40; the oblique edge 40 of the profile element 40 so created defines an angle w of, for example, 10° with the transverse plane E.

Figure 2:
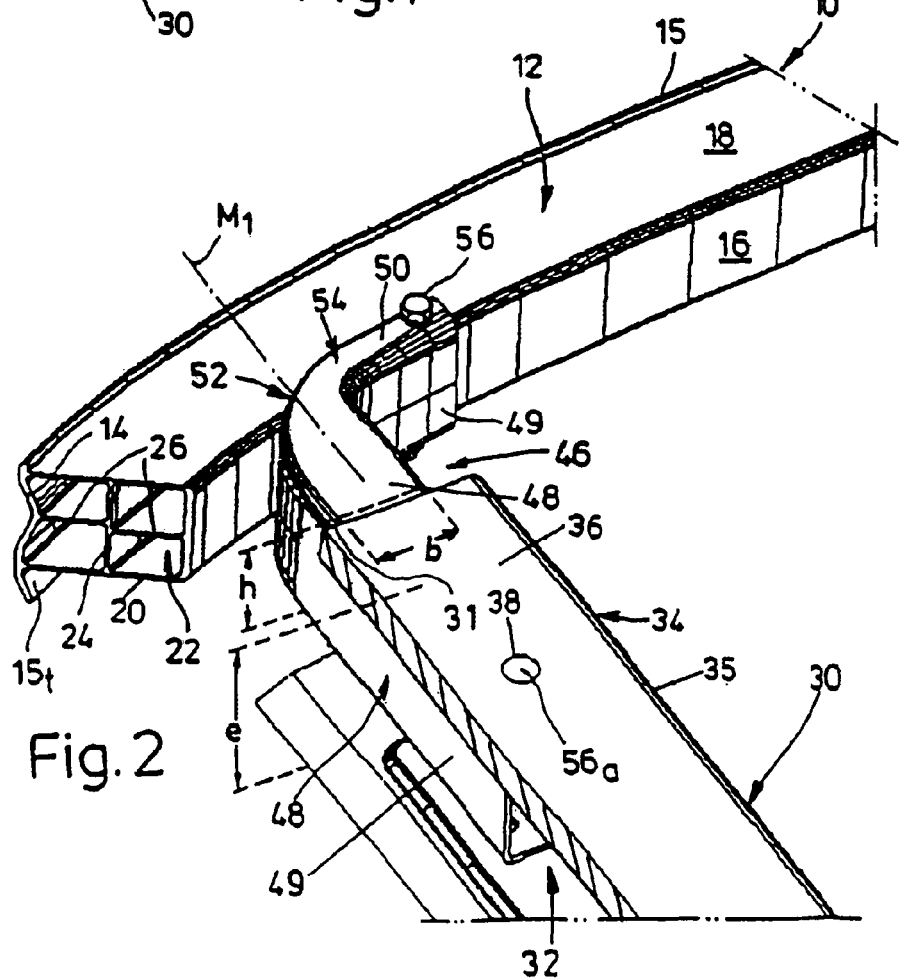
FIG. 2 is an oblique view enlarged with respect to FIG. 1 of a part of the bumper with holder.

Another configuration of the connection of the hollow profile 12 to the vehicle side member 30 is shown in FIG. 1 on the left end of the bumper 10 and evident from FIG. 2. The profile wall 14 serving as outer belt—and designed wave-like in cross section—engages over both transverse of flank walls 18 with wing-like wall sections as edge strips 15, 15t. As seen in FIG. 2, the side wall 34 of the vehicle side member 30 protrudes over the outer surface of the attached transverse wall 36 with an edge strip 35. The second side wall 34 is not drawn in here for the sake of clarity, its fastening region is illustrated in hashed section lines.

In the profile interior space 22 of the hollow profile 12 a transverse wall 24—directed parallel to the profile walls 14, 16—is provided unitarily with the profile walls 14, 16 and the flank walls 18 connecting these, each with a middle wall 26 running between the transverse wall and the profile walls 14, 16. These middle walls 26 may be offset in height and side relative to each other.

The connection of the hollow profile 12 to the vehicle side member 30 may be established by a holding member 46 configured from a hollow profile which, in turn, may be extruded from an aluminum alloy of a width "b" in the range of, for example, 55 mm, and a height "h" in the range of, for example, 75 mm. On its insertion section 48 assigned to the vehicle side member 30 of profile height e or its face edge 31 and screwed together in said vehicle side member of approximately rectangular cross section—of two parallel side walls 49 and transverse walls 50 of the hollow profile of the holder 46 connecting these—is followed by a curvature section 52.

In FIG. 2 right side wall 49 is curved outward—i.e., in this case out of the longitudinal axis M1 of the insertion section 48 to the right—and the other side wall 49 towards the end led against the former in such a manner that both side walls 49 lie on top of each other and each of the two transverse walls 50 is folded approximately in its longitudinal middle. The inner curvature contour runs corresponding to the outer surface of the inner profile wall 16 of the hollow profile 12, i.e., it encloses the angle w with "a" being parallel to the transverse plane E.

Double-layered legs 54 of the channel-like curvature section 52 so created are penetrated in the region of breakthroughs of screws 56 or similar connecting organs (elements)—not shown in the drawing—which additionally engage in breakthroughs of the flank walls 18 on the bumper side. Corresponding breakthroughs for connecting organs 56a are provided in the insertion section 48 of the holding member 46. In an embodiment, these connecting organs 56a are mounted in the vehicle side member 30 in breakthroughs 38. A profile element or a crash box 42a of substantially rectangular cross section of two side walls 45a and two transverse walls 42a of wall lengths "c", "f" connecting these is inserted in the side member 30 of FIGS. 3 and 4. The transitions of the side walls 45a to the transverse walls 47a, are formed by corner regions 45e which may be curved in the manner of a pitch circle.

In order to simplify the sliding-in process, the side walls 45a, 47a each run at a spacing "g" to the neighboring inner surface 48 of the side walls 34 and the transverse walls 36 of the side member 30 subject to the formation of gap spaces 41 and 41q.

In the profile element 42a, on the inside of each side wall 45a, an inner wall 51a is placed in front which is molded onto the transverse walls 47a on both ends and spaced from the latter offers a channel-like cross section. A receiving space 55—determined by the channel region 53 of the inner wall 51—is located on each molded-on region for a material strip 60 of hexagonal solid cross section mounted therein. The latter is equipped with a thread breakthrough 58 which is in alignment with a breakthrough 57 of the adjacent transverse wall 47a and the breakthrough 38 in the side member 30.

In FIG. 4, the center line "M" of the profile element 42a is in alignment with the longitudinal axis "B" of the surrounding side member 30. The transverse walls 47a of the profile element 42a standing at that spacing "g" to the inner surfaces 28 of the longitudinal profile 30 noticeably run axially parallel. The aligned breakthroughs 38, 57, 58 of the one system side determine a common center axis Q with the breakthroughs 58, 57, 38 of the other system side and each receive a tensile screw 56b indicated in FIG. 4, which towards the end is screwed together with the thread 59 of the thread breakthrough 58 and subject to the deformation of the profile element 42a pulls the transverse wall 47 of said profile element including the material strip 60 up against the adjacent side wall 34 of the side member 30. This deformation produces the profile element 42 shown in FIGS. 5 and 6.

Instead of those bent inner walls 51a shown in FIG. 3, FIGS. 5 and 6 illustrate, towards the side walls 45 and towards the middle axis "Q", inner walls 51 of profile element 42 axially parallel in cross section resulting from the completed bending process so that the regions 47 of the transverse walls lifted because of this directly bear against the inner surfaces 28 of the side member 30 and their outer spacing "c1" approximately corresponds to the width of the profile element 42, which according to FIG. 6 illustrates a curvature region 47k reduced to the wall length "c" mentioned in FIG. 3. Thus, within the side member 30, an insertion section 62 of axial length "z" bearing against said side member on both sides is created. The two side walls 45 parallel to the center axis "Q" which with relative to FIG. 3 more stretched corner regions 45g merge with the adjoining transverse walls 47, retain the gap spacing "g" to the inner surface 28 of the side member 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An arrangement for attaching a bumper to respective side members of a vehicle, comprising:
   a deformation organ which on the one end is provided for attachment to the bumper and on the other end comprises an insertion section for sliding into one of the side members, wherein said insertion section comprises transverse walls and an inner wall molded onto the transverse walls on both ends which is channel-like in cross section and stretchable subject to a tensile force acting on the transverse walls.
2. The arrangement according to claim 1, wherein the inner wall is arranged between the side walls of the insertion section connecting the transverse walls.
3. The arrangement according to claim 2, wherein the transverse walls are connected to the side walls at corner regions curved in the manner of a pitch circle.
4. The arrangement according to claim 3, further comprising a material strip received in a receiving space of the insertion section and equipped with a thread breakthrough which is in alignment with a breakthrough of the adjacent transverse wall.
5. The arrangement according to claim 4, further comprising a tensile screw extending through the breakthroughs of the material strip and the transverse wall and a breakthrough of one of the side members.
6. The arrangement according to claim 5, wherein the breakthroughs are arranged on both sides of a center line of the insertion section and have a common center axis.
7. The arrangement according to claim 6, wherein the deformation organ is produced from an extruded profile element.
8. The arrangement according claim 7, wherein the deformation organ is produced from metal.
9. An assembly for attaching a bumper to a vehicle having respective longitudinally extending side members, the assembly comprising:
   a deformation organ which is attached on the one end to the bumper and on the other end comprises an insertion section slid into the side member, wherein the insertion section includes transverse walls and an inner wall spanning the transverse walls, wherein the insertion section including the inner wall are configured to be deformed and pulled up against corresponding transverse walls of one of the side members.

\* \* \* \* \*